Feb. 24, 1925.
P. J. MURRAY ET AL
1,527,372
MULTIPLEX FRICTION SHOCK RESISTER
Filed July 13, 1923
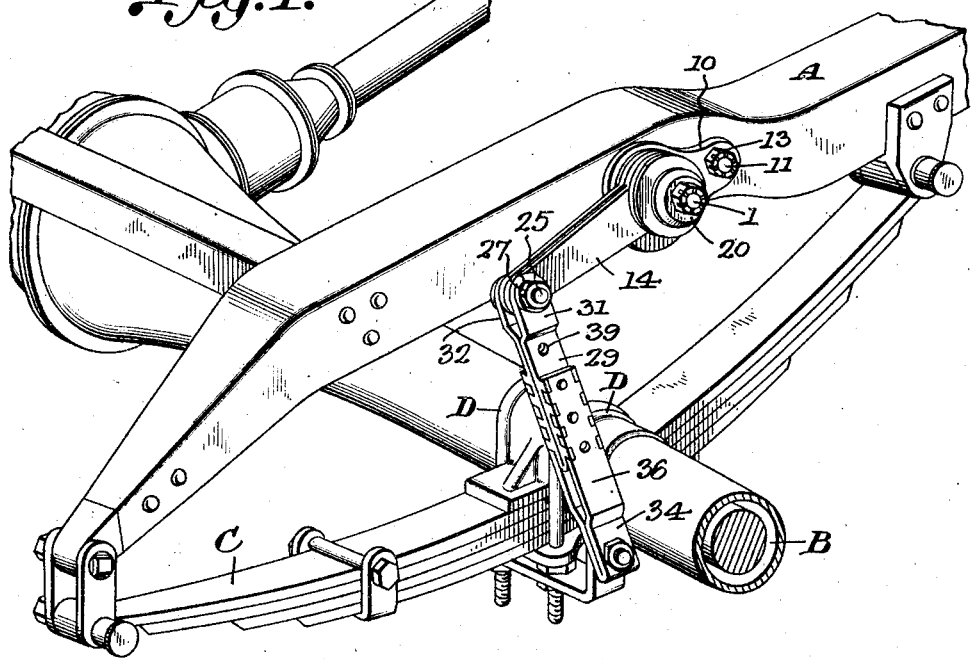
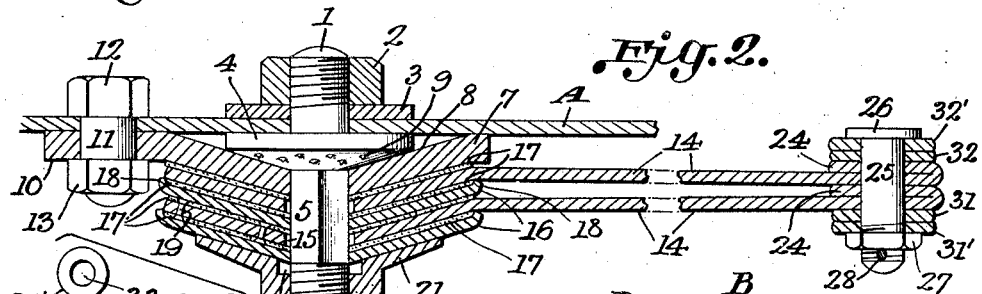
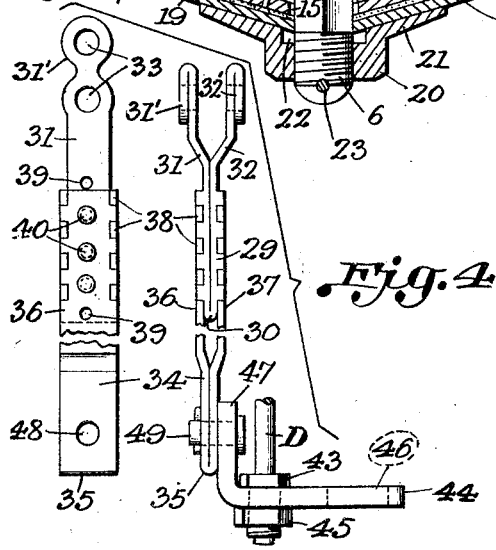
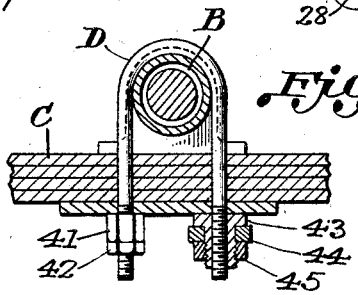
Inventors
P. J. Murray
and M. L. Clark
by their Attorneys
Baldwin & Wight

Patented Feb. 24, 1925.

1,527,372

UNITED STATES PATENT OFFICE.

PATRICK J. MURRAY AND MATTHEW L. CLARK, OF CARBONDALE, PENNSYLVANIA, ASSIGNORS TO ADVANCE CAR SPECIALTY MANUFACTURING COMPANY, OF SCRANTON, PENNSYLVANIA.

MULTIPLEX FRICTION SHOCK RESISTER.

Application filed July 13, 1923. Serial No. 651,334.

*To all whom it may concern:*

Be it known that we, PATRICK J. MURRAY and MATTHEW L. CLARK, citizens of the United States, and residents of Carbondale, in the county of Lackawanna and State of Pennsylvania, have invented certain new and useful Improvements in Multiplex Friction Shock Resisters, of which the following is a specification.

An object of our invention is to provide a simple an efficient friction shock resister that may be applied to any standard make of automobile without any change in the machine and which will prevent the transmission of sudden shocks to the body of the machine.

Another object is to provide a shock resister of this type which shall be relatively cheap to construct but strong and efficient in operation and in which the frictional resistance may be changed when desired.

Another object is to provide readily adjustable means for connecting the resister proper with the axle or spring carried thereby which will permit its immediate adaptation to various types of vehicles.

Other objects will be apparent from the following detailed description and the appended claims.

In the drawings:

Figure 1 is a perspective view of the shock resister in operative position on a car.

Figure 2 is a sectional view through a portion of the same.

Figure 3 is a sectional view showing the means of connection to the axle.

Figure 4 is a side and edge view of the connecting means between the resister proper and the axle.

The drawings show a portion of a side beam A, axle B, spring C, and U-bolts D for supporting the spring from the axle. These parts may be of any usual or desired construction and in themselves form no part of the invention.

At a suitable point a pivot bolt 1 passes through the side bar A and is provided at its inner threaded end with a nut 2 which presses a washer 3 against the side bar. On the outside of the frame the pivot bolt 1 has a shoulder 4 with a flat face fitting against the frame bar A, being drawn thereagainst by the nut 2. The outer face of this shoulder 4 is convex as clearly shown in Figure 2. The bolt also has a squared or other non-circular portion 5 and a threaded outer end 6 for purposes hereinafter explained.

A disk 7 is stamped out of steel or suitable metal and has a concave face 8 which fits against the convex face of the shoulder 4, and is preferably spot welded thereto as indicated at 9. This disk has an ear 10 through which passes a bolt 11 by which it is attached to the side frame A. This bolt is provided with a head 12 at one end and a nut 13 at the other end, although any equivalent means of holding the ear 10 firmly with relation to the frame may be adopted. This disk fits over the squared portion of the pivot bolt 1 and is therefore held against rotation relative thereto.

Two arms 14 which are duplicates, are punched out of steel and at one end are cup shaped to correspond with the disk 7. They have openings 15 fitting over the bolt 1 and large enough to rotate around the squared portion 5 thereof. Non-rotatably mounted on the squared portion 5 of the bolt 1 are identical disks 16. Friction disks 17 of any suitable material are interposed between the arms 14 and the disks 16 and also between the inner arm 14 and the member 7. The outer edges of the disks 16 are turned in as at 18 to hold the friction disks in position. Also, if desired, rivets 19 may be employed to fasten two friction disks to each arm 14. A flanged friction adjusting nut 20 has a flange 21 fitting against the outer disk 16, and has a central cut out portion 22 large enough to clear the squared portion 5 of the pivot bolt 1 when it is screwed down into place. This nut may be held in place by a cotter pin 23.

The outer end of each member 14 is folded on itself at 24 and the folded ends fit over a pivot bolt 25 having a head 26 at one end and a nut 27 at the other held in position by a cotter pin 28. The bolt 25 is connected to the axle by the following mechanism.

A steel member 29 is folded on itself at 30, the two parts lying against each other except at their outer ends where they are bent apart forming two branches 31 and 32, each of which has its respective end 31' and 32' folded on itself. All portions 31, 31', 32 and 32' are formed with a registering hole 33 which fits over the pivot pin 25, the branches of the member 29 lying outside of the ends of the arms 14 as clearly shown in Figure 2.

Another steel member 34 is folded on itself at 35 and the two parts lie against each other for a short distance, then separate widely enough into two branches 36 and 37 to embrace the member 29. The member 29 and branches 36 and 37 are formed with interfitting notches and projections 38 as clearly illustrated. These tend to prevent displacement of the members when adjusted, but furthermore, a plurality of holes 39 are formed in these members and bolts or screws 40 may be passed therethrough to positively hold the connection when the length is adjusted as desired.

The usual U-bolts are provided for fastening the springs to the axles, and these are held in place by nuts 41 and lock nuts 42. On one branch of the U-bolt these nuts are removed and their place is taken by a shouldered externally threaded nut 43. An angular metal member 44 fits over this nut and is held in place by a nut 45. This member 44 is extended and has an opening 46 preferably oval in shape to fit the other branch of the U-bolt. The oval shape permits attachment to various sized parts without trouble or any change in parts. The upper arm 47 of the member 44 has a hole adapted to register with the hole 48 in the member 34, and the parts are fastened together by a headed bolt 49 passing therethrough and fastened by a screw nut or cotter pin or both.

It is evident that all parts can be readily stamped or formed of sheet metal with the exception of the bolts and nuts and friction disks. The latter may be formed of any suitable material, and the number thereof may be varied as desired. While only two arms 14 are shown, more may be employed, or only one if found sufficient for certain cars. The connection between the shock resister and axle is readily adjustable but firm when adjusted and it cannot be accidentally displaced. Moreover, the mode of attachment to the U-bolt necessitates no modification of the machine and the provision of only the peculiar nut 43. The operation is evident, for since the arms 14 can rotate on the bolt 1 while the disks 16 and member 7 cannot, any relative movement between the spring C and body A will cause a relative movement between the arms 14 and the disks 16 against the friction of these members and interposed friction disks. Shocks that would otherwise be transmitted to the body of the bar will thus be absorbed and resisted. It is obvious that the same resistance will be afforded to movement in either direction.

Various detailed changes may be made in the precise embodiment without departing from the scope of the invention which is to be regarded as limited only by the appended claims.

We claim as our invention:

1. A shock resister comprising a pivot bolt passing through and rigidly supported by the side bar of an automobile, a shoulder on said bolt having a convex surface, a plate having an opening fitting over said bolt and an ear fastened to the side bar, said plate being concavo-convex in form and engaging said shoulder, a plurality of concavo-convex disks non-revolubly mounted on said bolt, a plurality of arms having concavo-convex portions revolubly mounted on said bolt, friction washers between said disks and arms, all of said disks and washers being dished in the same direction and means connecting the outer ends of the arms to the axle of the automobile.

2. A shock resister comprising a pivot bolt rigidly supported on the side bar of an automobile, a plate attached to said side bar and having a concavo-convex portion fitting over the bolt, a plurality of members revolubly mounted on said bolt and a plurality of members non-revolubly mounted thereon, friction disks between the revoluble and non-revoluble members, and carried by the former, all of said disks being nested and means for connecting the outer ends of the revoluble members to the axle of the automobile.

3. A shock resister comprising a bolt passing through and carried by the frame of an automobile and having a shoulder with convex face, a plurality of members concavo-convex in form which are nested and the inner of which bears against said face, means for holding some of said members against movement, other of said members being revoluble, friction disks interposed between the fixed and movable members and carried by the latter and means connecting the movable members to the axle of an automobile.

4. A shock resister comprising a member passing through and carried by the side bar of an automobile, a plurality of nested members carried by said member, means for holding certain of the nested members fixed, other of said members being movable, friction disks attached to the movable members, certain of said movable members being extended to form arms, and means adjustably connecting the arms to a portion of the automobile which has relative vertical movement with regard to the side bar.

In testimony whereof, we have hereunto subscribed our names.

P. J. MURRAY.
MATTHEW L. CLARK.